United States Patent
Suzuki et al.

(10) Patent No.: US 12,411,481 B1
(45) Date of Patent: Sep. 9, 2025

(54) CONTROL SYSTEM, CONTROL METHOD, AND METHOD OF PRODUCING SOLID

(71) Applicant: K.K. SUN METALON, Yokohama (JP)

(72) Inventors: Daichi Suzuki, Yokohama (JP); Tatsuhiro Iwama, Yokohama (JP); Kenji Ichiishi, Yokohama (JP)

(73) Assignee: K.K. Sun Metalon, Yokohama (JP)

( * ) Notice: Subject to any disclaimer, the term of this patent is extended or adjusted under 35 U.S.C. 154(b) by 0 days.

(21) Appl. No.: 19/089,770

(22) Filed: Mar. 25, 2025

(30) Foreign Application Priority Data

Dec. 19, 2024 (JP) ................. 2024-224192

(51) Int. Cl.
*G05B 19/418* (2006.01)

(52) U.S. Cl.
CPC ............. *G05B 19/4189* (2013.01); *G05B 2219/45244* (2013.01); *G05B 2219/49051* (2013.01)

(58) Field of Classification Search
CPC ...... G05B 19/4189; G05B 2219/45244; G05B 2219/49051
See application file for complete search history.

(56) References Cited

U.S. PATENT DOCUMENTS

| 6,928,892 B2 * | 8/2005 | Storbeck ............. G01N 15/06 73/865.8 |
| 2023/0217558 A1 | 7/2023 | Kou |
| 2024/0165700 A1 | 5/2024 | Nishioka et al. |
| 2024/0165706 A1 | 5/2024 | Nishioka et al. |

FOREIGN PATENT DOCUMENTS

| JP | 7270800 B1 | 5/2023 |
| JP | 7450312 B2 | 3/2024 |
| JP | 7450313 B2 | 3/2024 |

OTHER PUBLICATIONS

L'Orange, Christian, et al. "A high-throughput, robotic system for analysis of aerosol sampling filters." Aerosol and air quality research 21.11 (2021): 210037. (Year: 2021).*

* cited by examiner

*Primary Examiner* — Carlos R Ortiz Rodriguez
(74) *Attorney, Agent, or Firm* — Knobbe, Martens, Olson & Bear, LLP

(57) ABSTRACT

A control device capable of efficiently heating an object by a heating device is disclosed. The control system includes a receipt signal obtainer configured to obtain a receipt signal indicating that a transfer device has received an object, a device selector configured to select an available heating device as a selected heating device from among the plurality of heating devices in a case where the receipt signal obtainer has obtained the receipt signal, a movement instructor configured to instruct the transfer device to move to a position of the selected heating device, a standby signal obtainer configured to obtain a standby signal indicating that the transfer device stands by in the position of the selected heating device, and a loading instructor configured to instruct, in a case where the standby signal obtainer has obtained the standby signal, the selected heating device to open a door and instruct the transfer device to load the object into the selected heating device.

10 Claims, 12 Drawing Sheets

CONTROL SYSTEM, CONTROL METHOD, AND METHOD OF PRODUCING SOLID

BACKGROUND

Field

The present disclosure relates to a control system, a control method, and a method of producing a solid.

Related Art

In a product production process, a product or a raw material of the product may be heated (for example, see Japanese Patent No. 7450313, Japanese Patent No. 7450312, and Japanese Patent No. 7270800).

According several aspects, a control device is disclosed capable of efficiently heating an object by a heating device.

SUMMARY

A control system according to an embodiment of the present disclosure is a control system configured to control a transfer device and a plurality of heating devices, the control system including a receipt signal obtainer configured to obtain a receipt signal indicating that the transfer device has received an object, a device selector configured to select an available heating device as a selected heating device from among the plurality of heating devices in a case where the receipt signal obtainer has received the receipt signal, a movement instructor configured to instruct the transfer device to move to a position of the selected heating device, a standby signal obtainer configured to obtain a standby signal indicating that the transfer device stands by in the position of the selected heating device, a loading instructor configured to instruct, in a case where the standby signal obtainer has obtained the standby signal, the selected heating device to open a door and instruct the transfer device to load the object into the selected heating device, a loading signal obtainer configured to obtain a loading signal indicating that the transfer device has loaded the object into the selected heating device, a heating instructor configured to instruct, in a case where the loading signal obtainer has obtained the loading signal, the selected heating device to close the door and heat the object, a heating completion signal obtainer configured to obtain a heating completion signal indicating that heating of the object has been completed in the selected heating device, and an unloading instructor configured to instruct, in a case where the heating completion signal obtainer has obtained the heating completion signal, the selected heating device to open the door and instruct the transfer device to unload the object from the selected heating device.

In the control system, each of the plurality of heating devices includes an aerosol sensor, and in a case where the aerosol sensor detects an aerosol and thereafter, the aerosol has no longer been detected or the aerosol has become less than or equal to a predetermined amount, the heating completion signal may be issued.

In the control system, the aerosol may be smoke or vapor.

In the control system, the object may contain oil or water.

In the control system, the object may further contain a metal or a metal compound.

In the control system, each of the plurality of heating devices may include an irradiation device configured to emit electromagnetic waves therein.

In the control system, the transfer device may receive the object from the processing device.

In the control system, the processing device may be a molding machine.

In the control system, the molding machine may be a briquette machine.

The control system may further include a processing completion signal obtainer configured to obtain a processing completion signal indicating that processing on the object has been completed in the processing device, and a reception instructor configured to instruct the transfer device to receive the object from the processing device in a case where the processing completion signal obtainer has obtained the processing completion signal.

In the control system, in a case where the processing completion signal obtainer has obtained the processing completion signal, the movement instructor may instruct the transfer device to move to a position of the processing device.

In the control system, in a case where the loading signal obtainer has obtained the loading signal, the movement instructor may instruct the transfer device to move to the position of the processing device.

In the control system, in a case where the heating completion signal obtainer has obtained the heating completion signal, the movement instructor may instruct the transfer device to move to the position of the selected heating device.

The control system may further include a container status checker configured to obtain a container status signal indicating that a container has a space to accommodate the object, and in a case where the container status checker has obtained the container status signal, the movement instructor may instruct the transfer device to move the object unloaded from the selected heating device into the container.

In the control system, the heating instructor may transmit a heating condition based on a composition of the object to the selected heating device.

A method of controlling a transfer device and a plurality of heating devices according to an embodiment of the present invention includes obtaining a receipt signal indicating that the transfer device has received an object, selecting an available heating device as a selected heating device from among the plurality of heating devices in a case where the receipt signal has been obtained, instructing the transfer device to move to a position of the selected heating device, obtaining a standby signal indicating that the transfer device stands by in the position of the selected heating device, instructing, in a case where the standby signal has been obtained, the selected heating device to open a door and instructing the transfer device to load the object into the selected heating device, obtaining a loading signal indicating that the transfer device has loaded the object into the selected heating device, instructing, in a case where the loading signal has been obtained, the selected heating device to close the door and heat the object, obtaining a heating completion signal indicating that heating of the object has been completed in the selected heating device, and instructing, in a case where the heating completion signal has been obtained, the selected heating device to open the door and instructing the transfer device to unload the object from the selected heating device.

In the control method, after the loading signal has been obtained, until unloading of the object is instructed, the obtaining the receipt signal, the selecting the available heating device as the selected heating device, the instructing the movement, the obtaining the standby signal, and the instructing the loading may be repeated.

In the control method, each of the plurality of heating devices includes an aerosol sensor, and in a case where the aerosol sensor detects an aerosol and thereafter, the aerosol has no longer been detected or the aerosol has become less than or equal to a predetermined amount, the heating completion signal may be issued.

In the control method, the aerosol may be smoke or vapor.

In the control method, the object may contain oil or water.

In the control method, the object may further contain a metal or a metal compound.

In the control method, each of the plurality of heating devices may include an irradiation device configured to emit electromagnetic waves therein.

In the control method, the transfer device may receive the object from the processing device.

In the control method, the processing device may be a molding machine.

In the control method, the molding machine may be a briquette machine.

The control method may further include obtaining a processing completion signal indicating that processing on the object has been completed in the processing device, and instructing the transfer device to receive the object from the processing device in a case where the processing completion signal has been obtained.

In the control method, in a case where the processing completion signal has been obtained, the transfer device may be instructed to move to a position of the processing device.

In the control method, in a case where the loading signal has been obtained, the transfer device may be instructed to move to the position of the processing device.

In the control method, in a case where the heating completion signal has been obtained, the transfer device may be instructed to move to the position of the selected heating device.

The control method may further include obtaining a container status signal indicating that a container has a space to accommodate the object, in which in a case where the container status signal has been obtained, the transfer device may be instructed to move the object unloaded from the selected heating device into the container.

In the control method, a heating condition based on a composition of the object may be transmitted to the selected heating device.

A method of producing a solid according to an embodiment of the present disclosure includes: receiving, by a transfer device, an object; transmitting, to a control system, a receipt signal indicating that the transfer device has received the object; obtaining, by the control system, the receipt signal and selecting an available heating device as a selected heating device from among a plurality of heating devices; instructing, by the control system, the transfer device to move to a position of the selected heating device; transmitting, to the control system, a standby signal indicating that the transfer device stands by in the position of the selected heating device; instructing, by the control system, the selected heating device to open a door and instructing the transfer device to load the object into the selected heating device; transmitting, to the control system, a loading signal indicating that the transfer device has loaded the object into the selected heating device; instructing, by the control system, the selected heating device to close the door and heat the object; heating, by the selected heating device, the object to solidify; transmitting, by the selected heating device, a heating completion signal indicating that the heating of the object has been completed to the control system; and instructing, by the control system, the selected heating device to open the door and instructing the transfer device to unload the object from the selected heating device.

In the method of producing the solid, in the heating, by the selected heating device, the object to solidify, an impurity contained in the object may be reduced.

In the method of producing the solid, the impurity may be oil or water.

In the method of producing the solid, in the heating, by the selected heating device, the object to solidify, an oxide film contained in the object may be reduced.

In the method of producing the solid, after the loading signal has been transmitted to the control system, until unloading of the object is instructed, the transmitting the receipt signal to the control system, the selecting the available heating device as the selected heating device, the instructing the movement, the transmitting the standby signal to the control system, and the instructing the loading may be repeated.

In the method of producing the solid, each of the plurality of heating devices includes an aerosol sensor, and in a case where the aerosol sensor detects an aerosol and thereafter, the aerosol has no longer been detected or the aerosol has become less than or equal to a predetermined amount, the heating completion signal may be issued.

In the method of producing the solid, the aerosol may be smoke or vapor.

In the method of producing the solid, the object may further contain a metal or a metal compound.

In the method of producing the solid, each of the plurality of heating devices may include an irradiation device configured to emit electromagnetic waves therein.

In the method of producing the solid, the transfer device may receive the object from the processing device.

In the method of producing the solid, the processing device may be a molding machine.

In the method of producing the solid, the molding machine may be a briquette machine.

The method of producing the solid may further include obtaining a processing completion signal indicating that processing on the object has been completed in the processing device, and instructing the transfer device to receive the object from the processing device in a case where the processing completion signal has been obtained.

In the method of producing the solid, in a case where the processing completion signal has been obtained, the transfer device may be instructed to move to a position of the processing device.

In the method of producing the solid, in a case where the loading signal has been obtained, the transfer device may be instructed to move to the position of the processing device.

In the method of producing the solid, in a case where the heating completion signal has been obtained, the transfer device may be instructed to move to the position of the selected heating device.

The method of producing the solid may further include obtaining a container status signal indicating that a container has a space to accommodate the object, in which in a case where the container status signal has been obtained, the transfer device may be instructed to move the object unloaded from the selected heating device into the container.

In the method of producing the solid, a heating condition based on a composition of the object may be transmitted to the selected heating device.

A program according to an embodiment of the present invention is a program for causing a computer to execute a method of controlling a transfer device and a plurality of heating devices, the method including obtaining a receipt signal indicating that the transfer device has received an object, selecting an available heating device as a selected heating device from among the plurality of heating devices in a case where the receipt signal has been obtained, instructing the transfer device to move to a position of the selected heating device, obtaining a standby signal indicating that the transfer device stands by in the position of the selected heating device, instructing, in a case where the standby signal has been obtained, the selected heating device to open a door and instructing the transfer device to load the object into the selected heating device, obtaining a loading signal indicating that the transfer device has loaded the object into the selected heating device, instructing, in a case where the loading signal has been obtained, the selected heating device to close the door and heat the object, obtaining a heating completion signal indicating that heating of the object has been completed in the selected heating device, and instructing, in a case where the heating completion signal has been obtained, the selected heating device to open the door and instructing the transfer device to unload the object from the selected heating device.

In the method that the program causes the computer to execute, after the loading signal has been obtained, until unloading of the object is instructed, the obtaining the receipt signal, the selecting the available heating device as the selected heating device, the instructing the movement, the obtaining the standby signal, and the instructing the loading may be repeated.

In the method that the program causes the computer to execute, each of the plurality of heating devices includes an aerosol sensor, and in a case where the aerosol sensor detects an aerosol and thereafter, the aerosol has no longer been detected or the aerosol has become less than or equal to a predetermined amount, the heating completion signal may be issued.

In the method that the program causes the computer to execute, the aerosol may be smoke or vapor.

In the method that the program causes the computer to execute, the object may contain oil or water.

In the method that the program causes the computer to execute, the object may further contain a metal or a metal compound.

In the method that the program causes the computer to execute, each of the plurality of heating devices may include an irradiation device configured to emit electromagnetic waves therein.

In the method that the program causes the computer to execute, the transfer device may receive the object from the processing device.

In the method that the program causes the computer to execute, the processing device may be a molding machine.

In the method that the program causes the computer to execute, the molding machine may be a briquette machine.

The method that the program causes the computer to execute may further include obtaining a processing completion signal indicating that processing on the object has been completed in the processing device, and instructing the transfer device to receive the object from the processing device in a case where the processing completion signal has been obtained.

In the method that the program causes the computer to execute, in a case where the processing completion signal has been obtained, the transfer device may be instructed to move to a position of the processing device.

In the method that the program causes the computer to execute, in a case where the loading signal has been obtained, the transfer device may be instructed to move to the position of the processing device.

In the method that the program causes the computer to execute, in a case where the heating completion signal has been obtained, the transfer device may be instructed to move to the position of the selected heating device.

The method that the program causes the computer to execute may further include obtaining a container status signal indicating that a container has a space to accommodate the object, in which in a case where the container status signal has been obtained, the transfer device may be instructed to move the object unloaded from the selected heating device into the container.

In the method that the program causes the computer to execute, a heating condition based on a composition of the object may be transmitted to the selected heating device.

A computer readable recording medium according to an embodiment of the present invention is a recording medium having recorded thereon a program for causing a computer to execute a method of controlling a transfer device and a plurality of heating devices, the method including obtaining a receipt signal indicating that the transfer device has received an object, selecting an available heating device as a selected heating device from among the plurality of heating devices in a case where the receipt signal has been obtained, instructing the transfer device to move to a position of the selected heating device, obtaining a standby signal indicating that the transfer device stands by in the position of the selected heating device, instructing, in a case where the standby signal has been obtained, the selected heating device to open a door and instructing the transfer device to load the object into the selected heating device, obtaining a loading signal indicating that the transfer device has loaded the object into the selected heating device, instructing, in a case where the loading signal has been obtained, the selected heating device to close the door and heat the object, obtaining a heating completion signal indicating that heating of the object has been completed in the selected heating device, and instructing, in a case where the heating completion signal has been obtained, the selected heating device to open the door and instructing the transfer device to unload the object from the selected heating device.

In the method which the program recorded on the recording medium causes the computer to execute, after the loading signal has been obtained, until unloading of the object is instructed, the obtaining the receipt signal, the selecting the available heating device as the selected heating device, the instructing the movement, the obtaining the standby signal, and the instructing the loading may be repeated.

In the method which the program recorded on the recording medium causes the computer to execute, each of the plurality of heating devices includes an aerosol sensor, and in a case where the aerosol sensor detects an aerosol and thereafter, the aerosol has no longer been detected or the aerosol has become less than or equal to a predetermined amount, the heating completion signal may be issued.

In the method which the program recorded on the recording medium causes the computer to execute, the aerosol may be smoke or vapor.

In the method which the program recorded on the recording medium causes the computer to execute, the object may contain oil or water.

In the method which the program recorded on the recording medium causes the computer to execute, the object may further contain a metal or a metal compound.

In the method which the program recorded on the recording medium causes the computer to execute, each of the plurality of heating devices may include an irradiation device configured to emit electromagnetic waves therein.

In the method which the program recorded on the recording medium causes the computer to execute, the transfer device may receive the object from the processing device.

In the method which the program recorded on the recording medium causes the computer to execute, the processing device may be a molding machine.

In the method which the program recorded on the recording medium causes the computer to execute, the molding machine may be a briquette machine.

The method which the program recorded on the recording medium causes the computer to execute may further include obtaining a processing completion signal indicating that processing on the object has been completed in the processing device, and instructing the transfer device to receive the object from the processing device in a case where the processing completion signal has been obtained.

In the method which the program recorded on the recording medium causes the computer to execute, in a case where the processing completion signal has been obtained, the transfer device may be instructed to move to a position of the processing device.

In the method which the program recorded on the recording medium causes the computer to execute, in a case where the loading signal has been obtained, the transfer device may be instructed to move to the position of the processing device.

In the method which the program recorded on the recording medium causes the computer to execute, in a case where the heating completion signal has been obtained, the transfer device may be instructed to move to the position of the selected heating device.

The method which the program recorded on the recording medium causes the computer to execute may further include obtaining a container status signal indicating that a container has a space to accommodate the object, in which in a case where the container status signal has been obtained, the transfer device may be instructed to move the object unloaded from the selected heating device into the container.

In the method which the program recorded on the recording medium causes the computer to execute, a heating condition based on a composition of the object may be transmitted to the selected heating device.

A recording medium according to an embodiment of the present invention is a recording medium having recorded thereon a program for controlling a transfer device and a plurality of heating devices and for causing a computer to execute a method including obtaining a receipt signal indicating that the transfer device has received an object, selecting an available heating device as a selected heating device from among the plurality of heating devices in a case where the receipt signal has been obtained, instructing the transfer device to move to a position of the selected heating device, obtaining a standby signal indicating that the transfer device stands by in the position of the selected heating device, instructing, in a case where the standby signal has been obtained, the selected heating device to open a door and instructing the transfer device to load the object into the selected heating device, obtaining a loading signal indicating that the transfer device has loaded the object into the selected heating device, instructing, in a case where the loading signal has been obtained, the selected heating device to close the door and heat the object, obtaining a heating completion signal indicating that heating of the object has been completed in the selected heating device, and instructing, in a case where the heating completion signal has been obtained, the selected heating device to open the door and instructing the transfer device to unload the object from the selected heating device.

Advantageous Effect

According to several aspects of the present disclosure, it is possible to provide the control device capable of efficiently heating the object by the heating device.

DETAILED DESCRIPTION

Hereinafter, an embodiment of the present invention will be described with reference to the drawings. It is noted however that the drawings are schematic drawings. Therefore, specific dimensions and the like are to be determined in the light of the following description. In addition, parts with mutually different dimensional relationships and ratios are of course included between the mutual drawings too.

Figure 1:
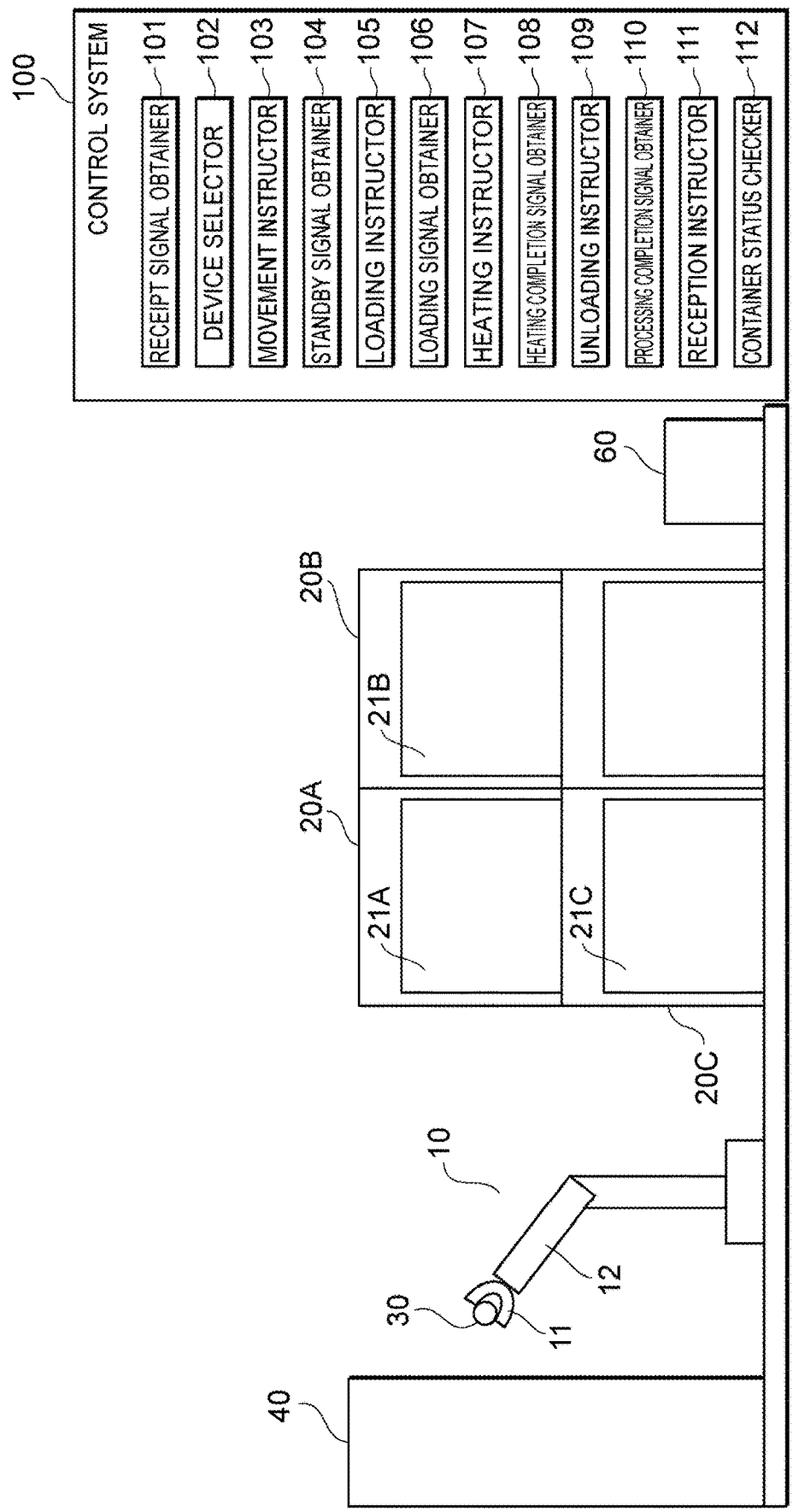
FIG. 1 is a schematic diagram of a control system according to an embodiment.

As illustrated in FIG. 1, a control system 100 according to the embodiment which is configured to control a transfer device 10 and a plurality of heating devices 20A, 20B, 20C, . . . (20x) includes a receipt signal obtainer 101 configured to obtain a receipt signal indicating that the transfer device 10 has received an object 30, a device selector 102 configured to select an available heating device as a selected heating device from among the plurality of heating devices 20A, 20B, 20C . . . in a case where the receipt signal obtainer 101 has obtained obtain the receipt signal, and a movement instructor 103 configured to instruct the transfer device 10 to move to a position of the selected heating device.

Figure 2:
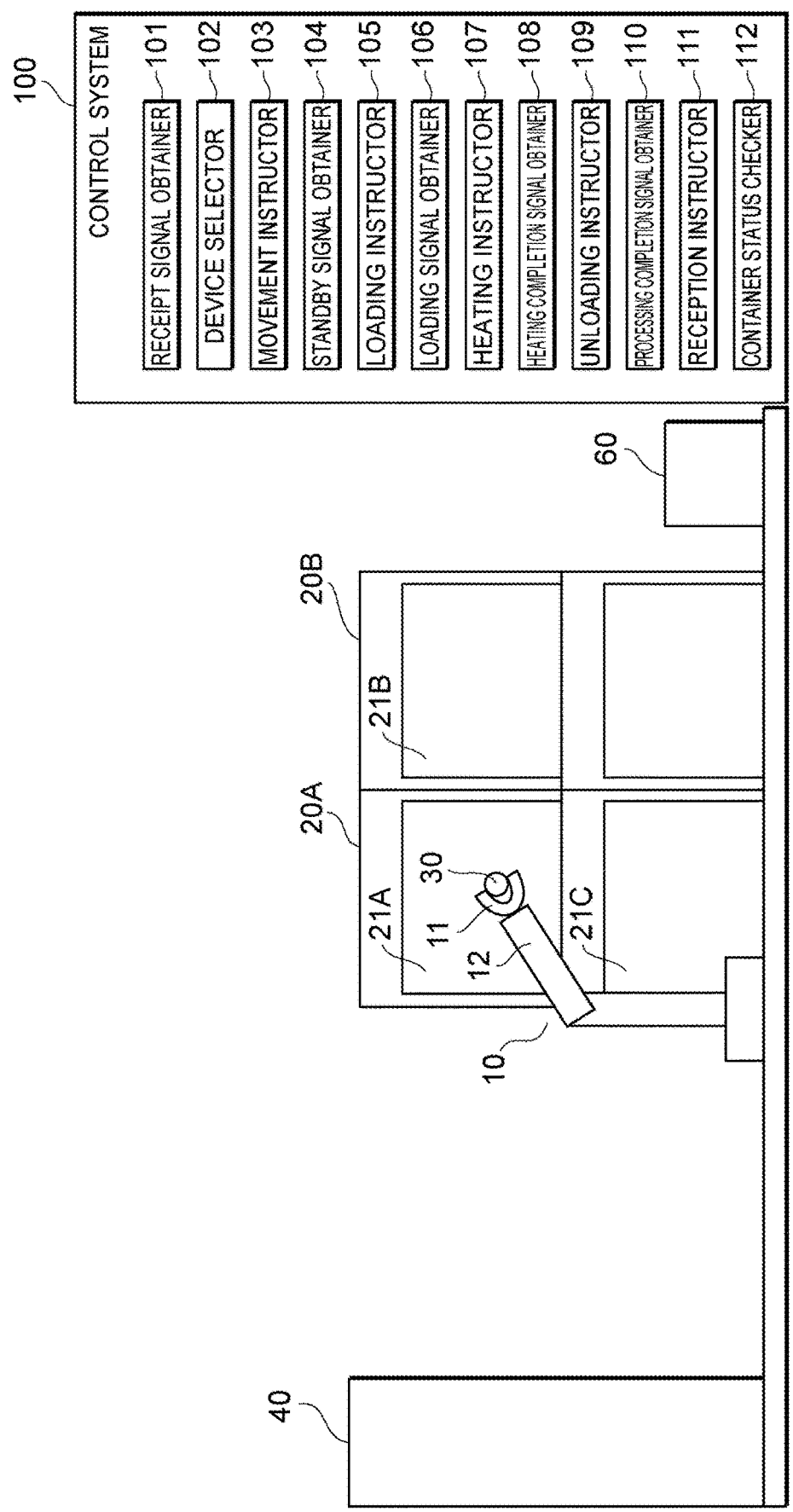
FIG. 2 is a schematic diagram of the control system according to the embodiment.
Figure 3:
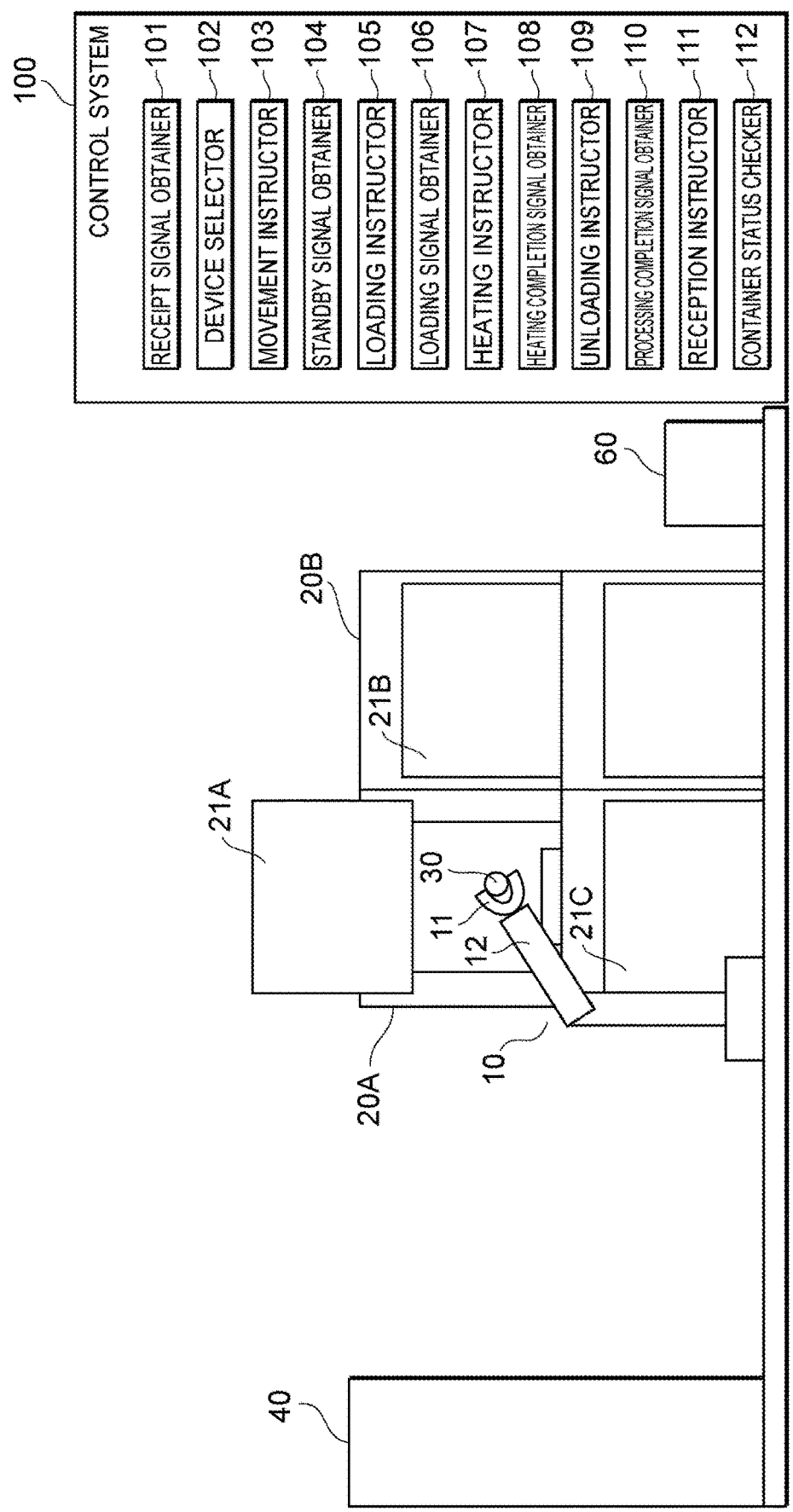
FIG. 3 is a schematic diagram of the control system according to the embodiment.
Figure 4:
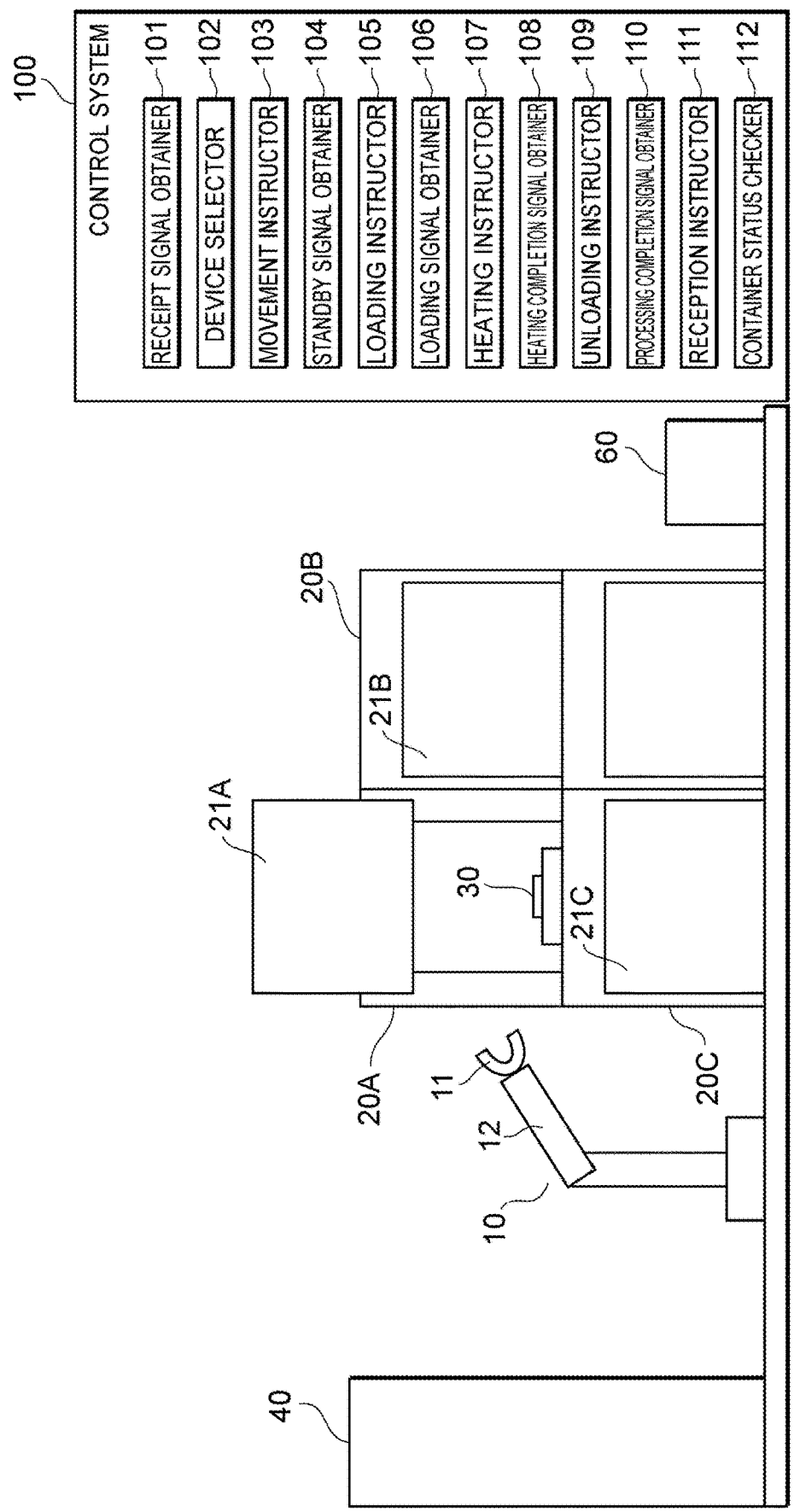
FIG. 4 is a schematic diagram of the control system according to the embodiment.

The control system 100 according to the embodiment also includes a standby signal obtainer 104 configured to obtain a standby signal indicating that the transfer device 10 stands by in the position of the selected heating device as illustrated in FIG. 2, a loading instructor 105 configured to instruct, in a case where the standby signal obtainer 104 has obtained the standby signal, the selected heating device to open the door 21A and instruct the transfer device 10 to load the object 30 into the selected heating device, and a loading signal obtainer 106 configured to obtain a loading signal indicating that the transfer device 10 has loaded the object 30 in the selected heating device as illustrated in FIG. 3 and FIG. 4. In a case where the loading signal obtainer 106 has obtained the loading signal, the movement instructor 103 may instruct the transfer device 10 to move to a position of a processing device 40 configured to process the object 30.

Figure 5:
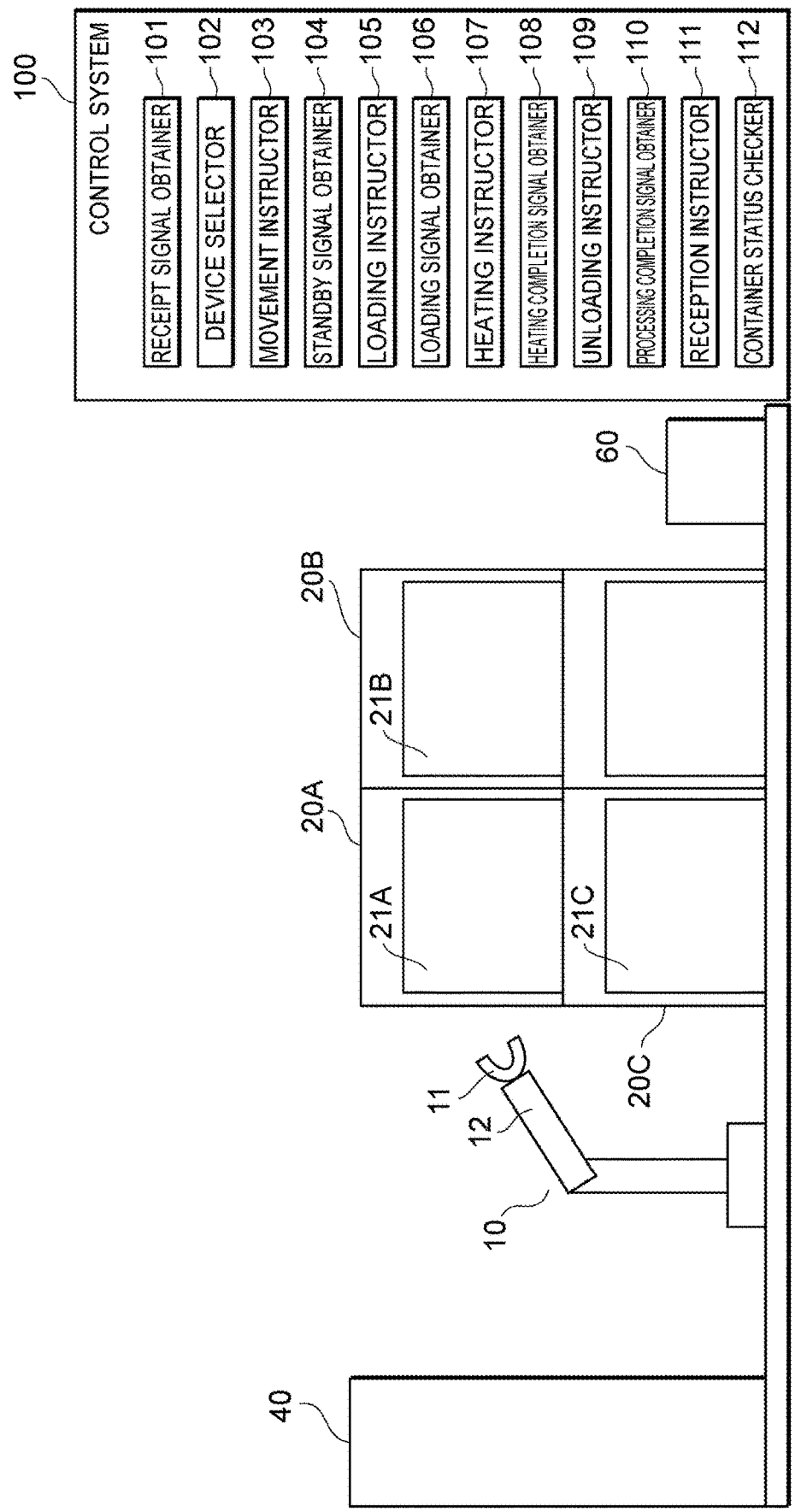
FIG. 5 is a schematic diagram of the control system according to the embodiment.

In addition, the control system 100 according to the embodiment includes a heating instructor 107 configured to instruct, in a case where the loading signal obtainer 106 has obtained the loading signal, the selected heating device to close the door 21A and heat the object 30 as illustrated in FIG. 5, a heating completion signal obtainer 108 configured to obtain a heating completion signal indicating that heating of the object 30 has been completed in the selected heating device, and an unloading instructor 109 configured to instruct, in a case where the heating completion signal obtainer 108 has obtained the heating completion signal, the selected heating device to open the door 21A and instruct the transfer device 10 to unload the object 30 from the selected heating device. The heating instructor 107 may transmit a heating condition based on a composition of the object 30 to the selected heating device. In a case where the heating completion signal obtainer 108 has obtained the heating completion signal, the movement instructor 103 may instruct the transfer device 10 to move to the position of the selected heating device.

In addition, the control system 100 according to the embodiment may include a processing completion signal obtainer 110 configured to obtain a processing completion signal indicating that processing of the object 30 in the processing device 40 has been completed, and a reception instructor 111 configured to instruct, in a case where the processing completion signal obtainer 110 has obtained the processing completion signal, the transfer device 10 to receive the object 30 from the processing device 40. In a case where the processing completion signal obtainer 110 has obtained the processing completion signal, the movement instructor 103 may instruct the transfer device 10 to move to the position of the processing device 40.

Figure 6:
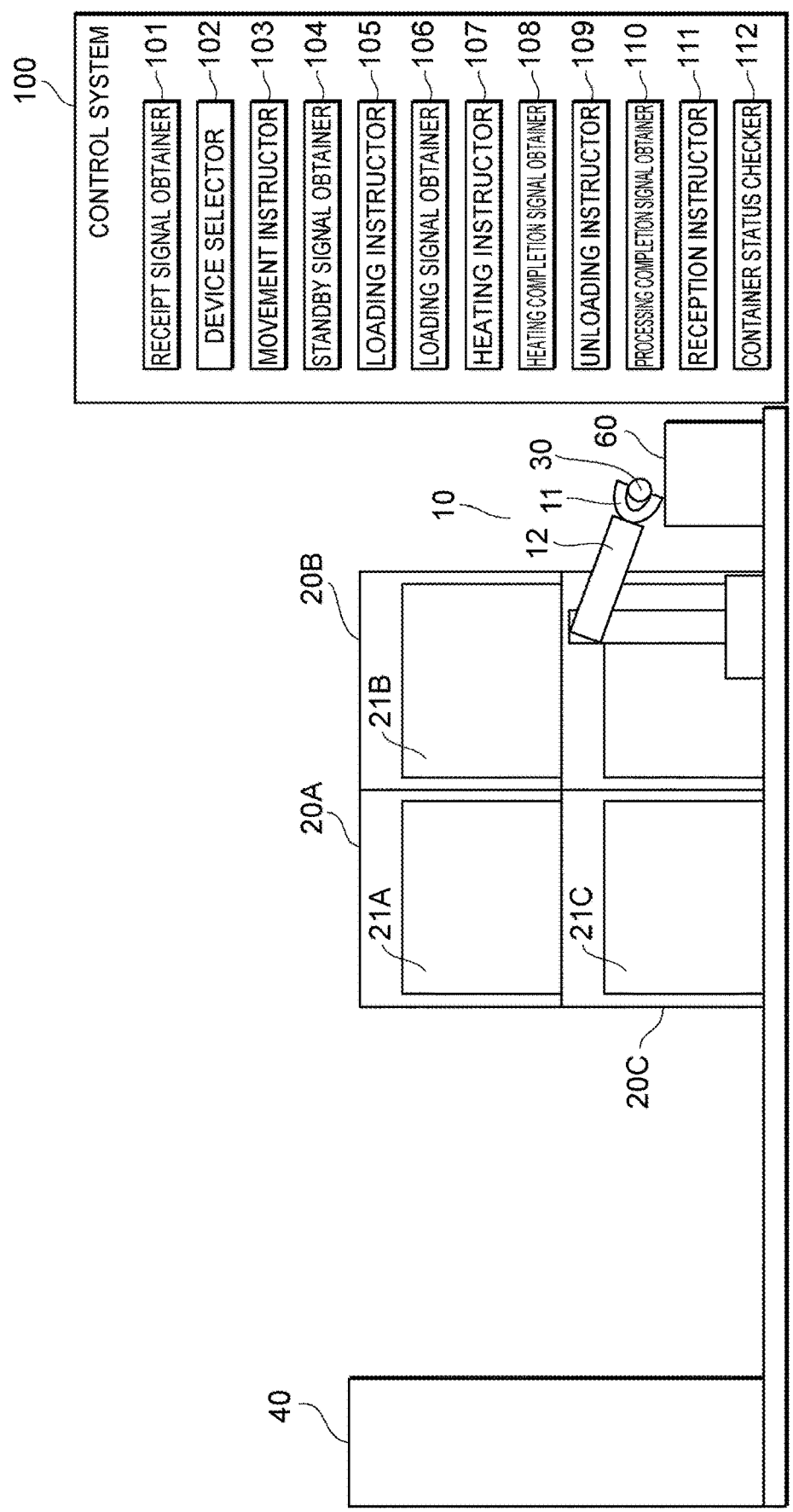
FIG. 6 is a schematic diagram of the control system according to the embodiment.

In addition, the control system 100 according to the embodiment may further include a container status checker 112 configured to obtain a container status signal indicating that a container 60 designed to store the object 30 after being heated has a space to accommodate the object 30. In a case where the container status checker 112 has obtained the container status signal, as illustrated in FIG. 6, the movement instructor 103 may instruct the transfer device 10 to move the object 30 unloaded from the selected heating device into the container 60.

The control system 100 is, for example, a computer and includes a processor such as a CPU (central processing unit) or FPGA (field-programmable gate array) and a volatile and/or nonvolatile storage device such as a ROM (read only memory), a RAM (random access memory), and a hard disk. It is noted however that the storage device may be outside the computer or may be situated in a location away from the computer.

The receipt signal obtainer 101, the device selector 102, the movement instructor 103, the standby signal obtainer 104, the loading instructor 105, the loading signal obtainer 106, the heating instructor 107, the heating completion signal obtainer 108, the unloading instructor 109, the processing completion signal obtainer 110, the reception instructor 111, and the container status checker 112 are realized when a program stored in the storage device is executed by the processor in the computer.

Alternatively, the device selector 102, the movement instructor 103, the standby signal obtainer 104, the loading instructor 105, the loading signal obtainer 106, the heating instructor 107, the heating completion signal obtainer 108, the unloading instructor 109, the processing completion signal obtainer 110, the reception instructor 111, and the container status checker 112 may be realized by a hardware such as, for example, a PLC (programmable logic controller).

The control system 100, and the transfer device 10, the heating devices 20A, 20B, 20C . . . and the container 60 are electrically connected to one another via a wired or wireless configuration and can mutually transmit and receive electric signals. The control system 100, and the transfer device 10, the heating devices 20A, 20B, 20C . . . , and the container 60 may be arranged in separate locations. Alternatively, the control system 100, and the transfer device 10, the heating devices 20A, 20B, 20C . . . , and the container 60 may be arranged in adjacent locations. The control system 100 may be arranged inside any one of the transfer device 10, the heating devices 20A, 20B, 20C . . . , and the container 60.

The object 30 is not particularly limited and may be, for example, an industrial material, an industrial product, a food material, and food. The object 30 is also referred to as a work. A shape of the object 30 is not particularly limited and is, for example, disk-shaped, cylindrical, and prismatic. A hardness of the object 30 is not particularly limited and may be hard or may be brittle as long as the object 30 can be transferred by the transfer device 10. A material of the object 30 is not particularly limited and may be a metal, a non-metallic inorganic matter, and an organic matter. The object 30 may be a metal briquette obtained by compressing a metal material. The material of the object 30 may contain a metal element or a metal compound such as an alloy. Examples of the metal include iron (Fe), nickel (Ni), copper (Cu), gold (Au), silver (Ag), aluminum (Al), and cobalt (Co).

A sintering temperature of iron (Fe) is, for example, 1200° C. A melting point of iron (Fe) is 1538° C. A sintering temperature of nickel (Ni) is, for example, 1200° C. A melting point of nickel (Ni) is 1495° C. A sintering temperature of copper (Cu) is, for example, 800° C. A melting point of copper (Cu) is 1085° C. A sintering temperature of gold (Au) is, for example, 800° C. A melting point of gold (Au) is 1064° C. A sintering temperature of silver (Ag) is, for example, 750° C. A melting point of silver (Ag) is 962° C. A sintering temperature of aluminum (Al) is, for example, 500° C. A melting point of aluminum (Al) is 660° C. A sintering temperature of cobalt (Co) is, for example, 1100° C. A melting point of cobalt (Co) is 1455° C.

The material of the object 30 may contain one type of a metal or may contain a plurality of types of metals. Examples of the metal compound include an alloy consisting of a plurality of metallic elements, an alloy consisting of a metallic element and a non-metallic element, a metal oxide, a metal hydroxide, a metal chloride, a metal carbide, a metal boride, and a metal sulfide but are not particularly limited. A metal powder may contain, as alloy components, for example, silicon (Si), manganese (Mn), chromium (Cr), nickel (Ni), carbon (C), boron (B), copper (Cu), aluminum (Al), titanium (Ti), niobium (Nb), vanadium (V), zinc (Zn), sulfur (S), and the like.

The object 30 may contain an impurity. In a case where the object 30 is a metal briquette, the object 30 may contain an impurity such as oil, a lubricant, an organic compound, an aqueous solution, and water. The impurity may be volatile. An oxide such as an oxide film may be formed in the object 30.

The transfer device 10 may be, for example, a transfer robot. The transfer device 10 can, for example, move in any direction on a floor. Alternatively, the transfer device 10 can move along a rail and a guide. The rail and the guide may be set on the floor or may be suspended from a ceiling. The transfer device 10 includes a grip device 11 configured to grip the object 30, for example. The grip device 11 is also referred to as a robot hand or an end effector. The transfer device 10 includes, for example, a movement device 12 which is connected to the grip device 11 and configured to move the grip device 11. The movement device 12 can move in a three-dimensional direction and can move the grip device 11 to any location. The movement device 12 may include a robot arm and a manipulator. The movement device 12 may include a vertical robot arm, a SCARA robot arm, a parallel link robot arm, and a Cartesian robot arm.

The transfer device 10 receives the object 30, for example, from the processing device 40 which processes the object 30. Examples of the processing device 40 include a briquette machine. The briquette machine may be a molding machine, a compression machine, and a solidification machine. The processing device 40 processes the material to produce the object 30. The processing device 40 applies a pressure to the material, for example, to produce the object 30, which is a molded product. A shape and a size of the material are not limited. The material is, for example, a metal material. The metal material is, for example, a metal piece. The metal piece may be, for example, a metal cut piece, a metal fragment, a metal chip, a metal machining dust, or a metal power. The pressure to be applied to the material by the processing device 40 is not limited but is, for example, greater than or equal to 1 MPa, greater than or equal to 100 MPa, or greater than or equal to 200 MPa and is less than or equal to 2000 MPa, less than or equal to 1900 MPa, or less than or equal to 1800 MPa. Examples of the pressure application method include uniaxial molding, cold isostatic pressing (CIP) molding, hot isostatic pressing (HIP) molding, roller pressurization, and the like.

Means for heating the object 30 by each of the heating devices 20A, 20B, 20C . . . is not particularly limited. The heating devices 20A, 20B, 20C . . . irradiate the object 30, for example, with electromagnetic waves to heat the object 30. The heated object 30 sinters or melts to solidify, for example. In a case where the object 30 contains a volatile impurity, when the object 30 is heated, the impurity is vaporized. According to this, the impurity is reduced in the object 30. Alternatively, the impurity is removed from the object 30. In a case where the object 30 contains an oxide such as an oxide film, when the object 30 is heated, the oxide is vaporized. Alternatively, reduction of the oxide occurs. According to this, the oxide is reduced in the object 30. Alternatively, the oxide is removed from the object 30.

The electromagnetic waves are, for example, millimeter waves and microwaves. The millimeter waves are electromagnetic waves, for example, with a frequency from 30 GHz to 300 GHz. The microwaves are electromagnetic waves, for example, with a frequency from 300 MHz to 30 GHz. Each of the heating devices 20A, 20B, 20C . . . may include a pressurizer configured to apply a pressure to the object 30. The pressurizer may apply a pressure to the object 30 at least any of moments before the object 30 is irradiated with electromagnetic waves, while the object 30 is irradiated with electromagnetic waves, and after the object 30 is irradiated with electromagnetic waves.

The heating devices 20A, 20B, 20C . . . respectively include chambers and doors 21A, 21B, 21C . . . provided in the chambers. When the object 30 is put into the chamber, the heating devices 20A, 20B, 20C . . . open the doors 21A, 21B, 21C . . . , respectively. When the object 30 is heated in the chamber, the heating devices 20A, 20B, 20C . . . close the doors 21A, 21B, 21C . . . , respectively. When the object 30 is taken out from the chamber, the heating devices 20A, 20B, 20C . . . open the doors 21A, 21B, 21C . . . , respectively.

Figure 7:
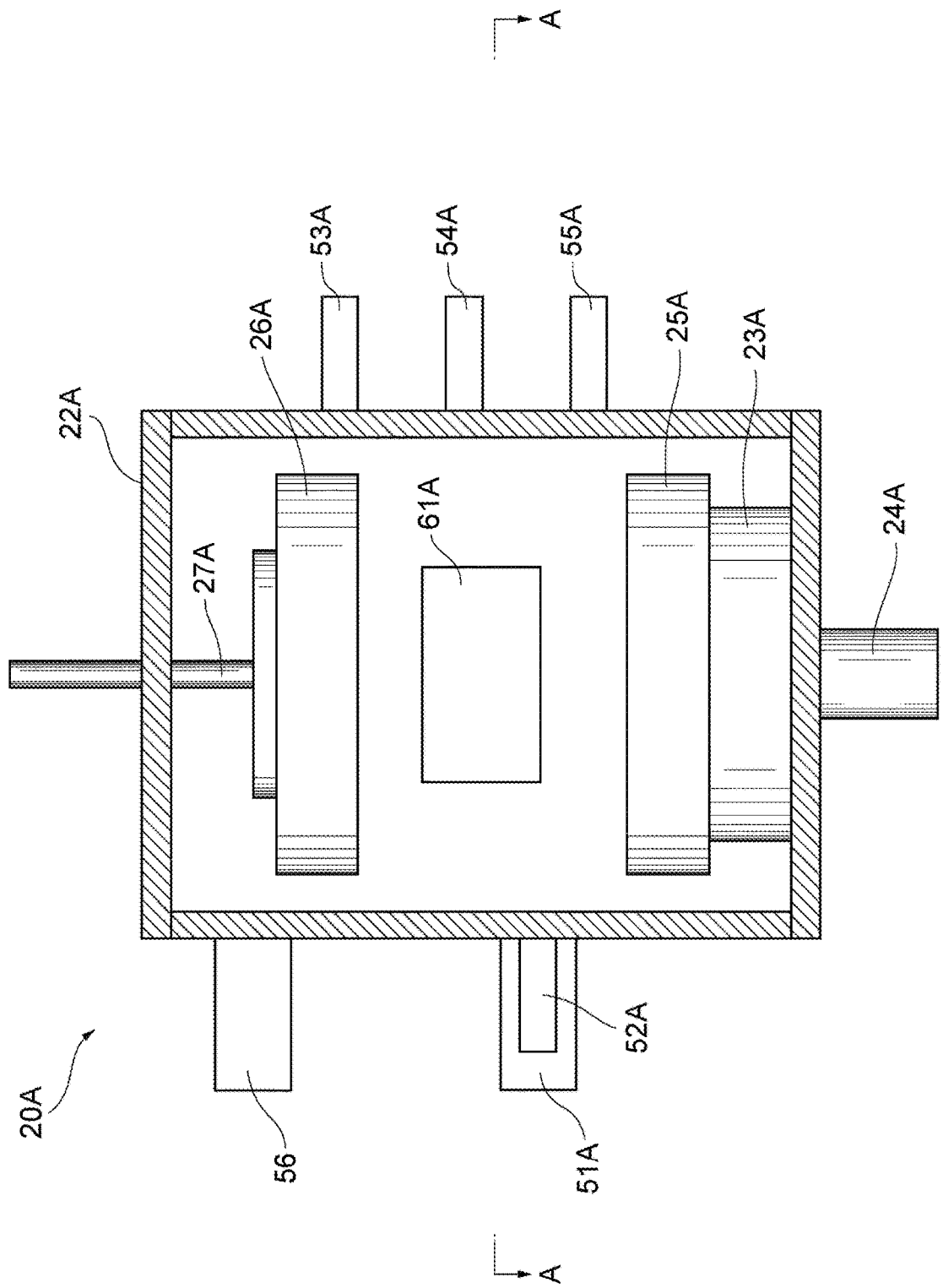
FIG. 7 is a schematic side view of an inside of a heating device according to the embodiment.
Figure 8:
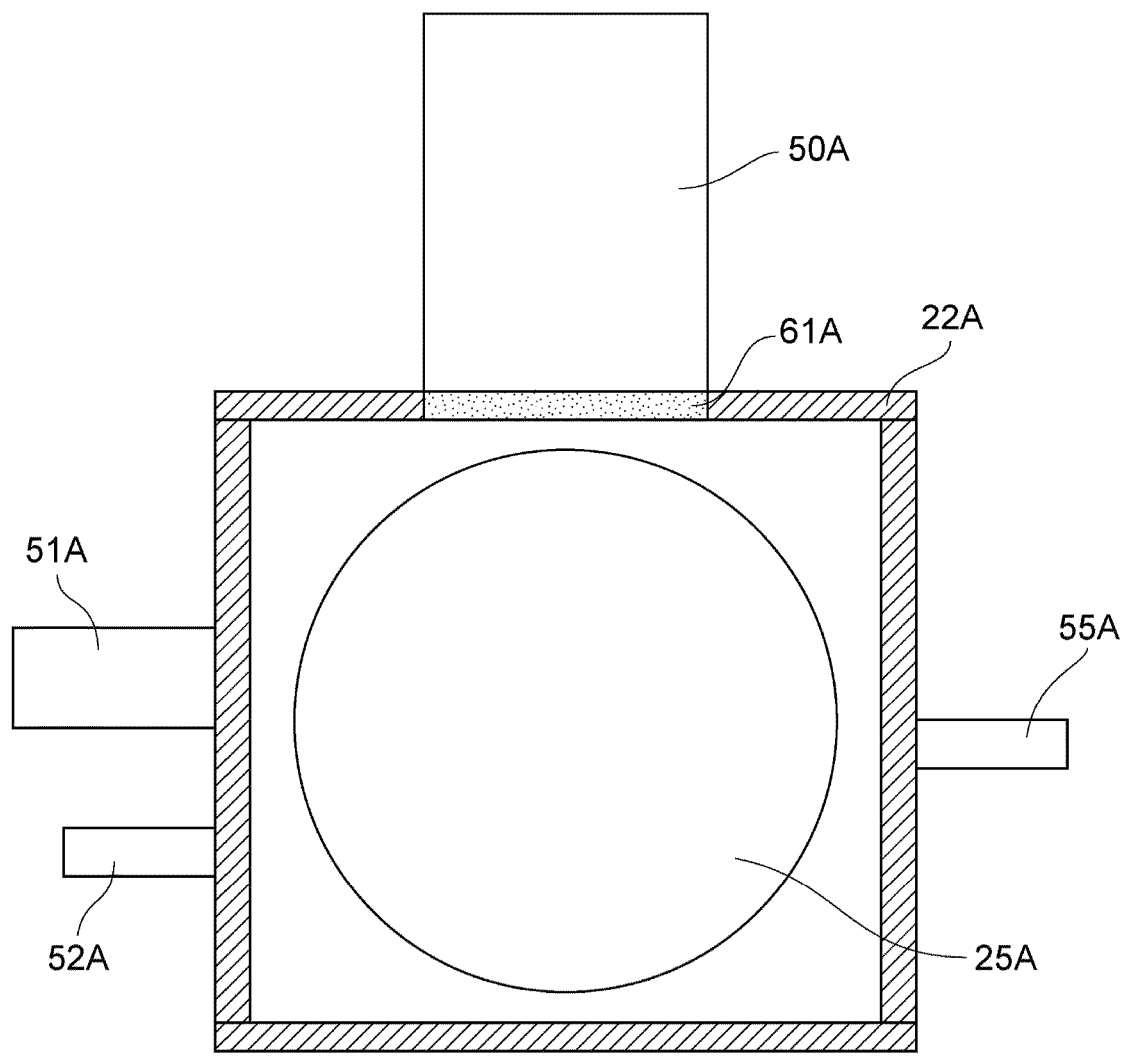
FIG. 8 is a schematic top view of the inside of the heating device according to the embodiment as viewed from an A-A direction in FIG. 7.

For example, the heating devices 20A, 20B, 20C . . . have a same configuration. Hereinafter, the configuration of the heating device 20A will be described. The heating device 20A includes, for example, as illustrated in FIG. 7 and FIG. 8, a chamber 22A, an electromagnetic wave irradiation device 50A configured to emit electromagnetic waves within the chamber 22A, and a stage 23A which is provided in the chamber 22A and designed to place the object 30 thereon. A window 61A for allowing electromagnetic waves emitted from the electromagnetic wave irradiation device 50A to pass through is provided in the chamber 22A. The heating device 20A may include a drive device 24A configured to rotate the stage 23A. By rotating the stage 23A, it is possible to evenly irradiate the object 30 with electromagnetic waves. A promotor 25A configured to promote heating of the object 30 may be arranged on the stage 23A, and the object 30 may be arranged on the stage 23A via the promotor 25A.

Figure 9:
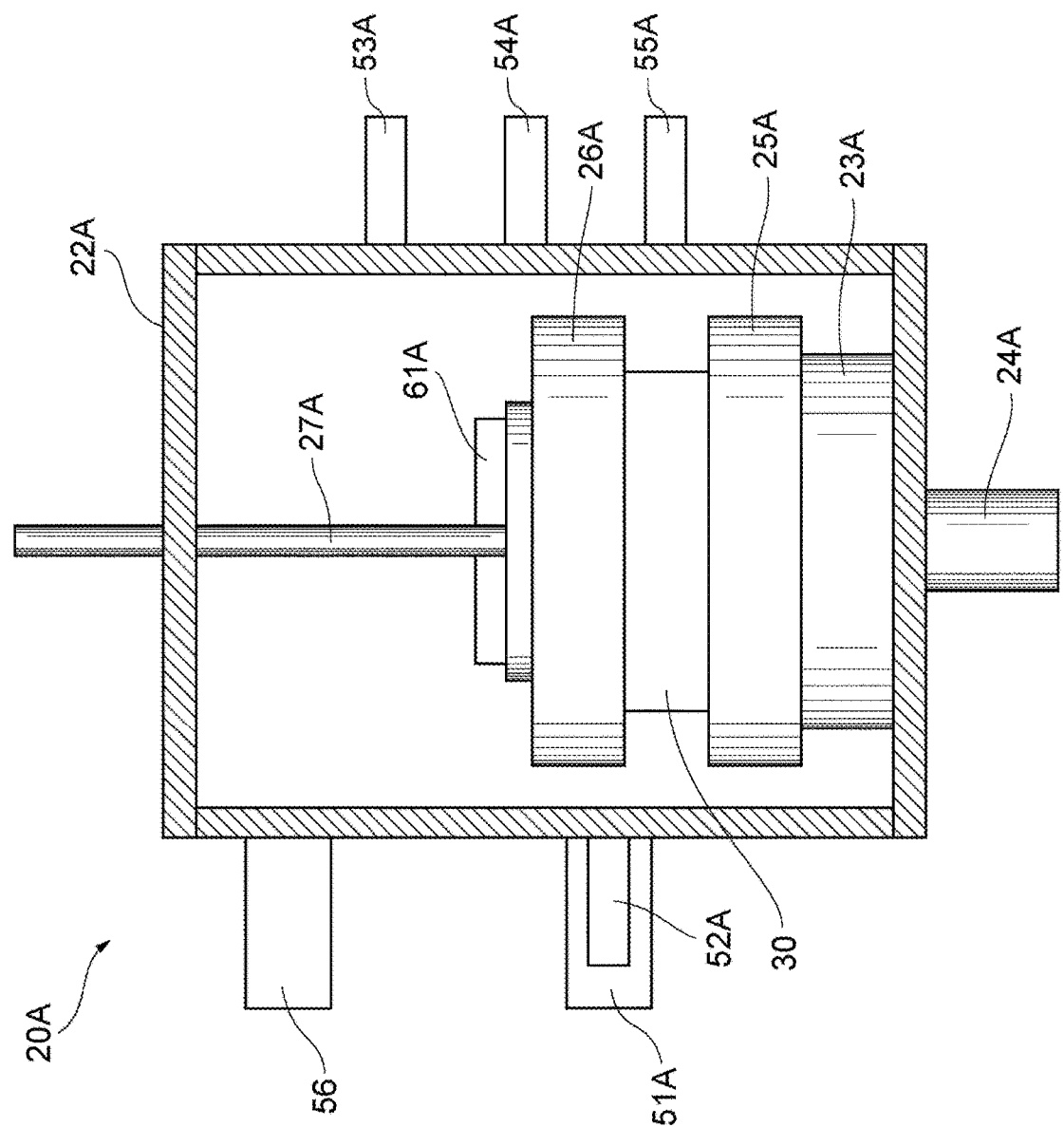
FIG. 9 is a schematic side view of the inside of the heating device according to the embodiment.

The heating device 20A may include a promotor 26A in contact with a top surface of the object 30 as illustrated in FIG. 9. The promotor 26A is configured to be movable up and down inside the chamber 22A. The promotor 26A is connected to a shaft 27A, for example. When the stage 23A rotates, the promotor 26A passively rotates via a friction force between a top surface of the stage 23A and a bottom surface of the promotor 25A, a friction force between a top surface of the promotor 25A and a bottom surface of the object 30, and a friction force between the top surface of the object 30 and a bottom surface of the promotor 26A.

The promotors 25A and 26A may contain a thermal insulation material with a higher transmittance of electromagnetic waves than that of the object 30 and a lower absorption degree of electromagnetic wave than that of the object 30. The thermal insulation material has a higher melting point than a melting point of the object 30. Since the thermal insulation material has a low absorption degree of electromagnetic waves, even when irradiated with electromagnetic waves, the thermal insulation material has a low degree of heat generation and exhibits a heat insulation effect. In addition, since the thermal insulation material has the higher melting point than that of the object 30, even when irradiated with electromagnetic waves, the thermal insulation material has a stable shape. For this reason, even while the object 30 irradiated with electromagnetic waves sinters or melts, shapes of the promotors 25A and 26A containing the thermal insulation material may be stable.

The thermal insulation material may contain a metal oxide or may contain a metalloid oxide. Examples of the metal and metalloid oxides include aluminum oxide ($Al_2O_3$), silicon oxide ($SiO_2$), magnesium oxide (MgO), zirconium oxide ($ZrO_2$), and titanium oxide ($TiO_2$) but are not particularly limited. For example, a melting point of aluminum oxide ($Al_2O_3$) is 2072° C. A melting point of silicon oxide ($SiO_2$)

is 1710° C. A melting point of magnesium oxide (MgO) is 2852° C. The thermal insulation material may be a compound of these.

The promotors 25A and 26A may contain an absorbing material that absorbs electromagnetic waves in a temperature range at least partially below a temperature range in which the object 30 absorbs electromagnetic waves. The absorbing material has a higher melting point than the melting point of the object 30. At least part of the temperature range in which the absorbing material absorbs electromagnetic waves is lower than the temperature range in which the object 30 absorbs electromagnetic waves. In a case where the object 30 contains a metal, the temperature range in which the object 30 absorbs electromagnetic waves is, for example, greater than or equal to 300° C. and less than or equal to 1200° C., greater than or equal to 450° C. and less than or equal to 1100° C., or greater than or equal to 600° C. and less than or equal to 800° C. The temperature range in which the absorbing material absorbs electromagnetic waves is, for example, greater than or equal to 100° C. and less than or equal to 1000° C., greater than or equal to 250° C. and less than or equal to 900° C., or greater than or equal to 400° C. and less than or equal to 600° C.

At least part of the temperature range in which the absorbing material absorbs electromagnetic waves is preferably overlapped with the temperature range in which the object 30 absorbs electromagnetic waves. Since the absorbing material absorbs electromagnetic waves in the temperature range at least partially below the temperature range in which the object 30 absorbs electromagnetic waves, the absorbing material generates heat faster than the object 30. For this reason, until the object 30 reaches the temperature range for absorbing electromagnetic waves, the absorbing material can heat the object 30. Therefore, when the promotors 25A and 26A contain the absorbing material, a temperature of the object 30 can reach the temperature range for absorbing electromagnetic waves faster, and a heating time period of the object 30 can be shortened. In addition, since the absorbing material absorbs electromagnetic waves in the temperature range at least partially below the temperature range in which the object 30 absorbs electromagnetic waves, it is possible to avoid heating the promotors 25A and 26A more than necessary. For this reason, while the object 30 irradiated with electromagnetic waves sinters or melts too, the shapes of the promotors 25A and 26A containing the absorbing material may be stable.

The absorbing material contains, for example, a carbon material. Examples of the carbon material include carbon black, an amorphous carbon, graphite, silicon carbide, carbon resin, and a metal carbide but are not particularly limited. The absorbing material may contain a metal nitride, a metal oxide, a metal boride, and the like that absorb electromagnetic waves in a temperature range at least partially below the temperature range in which the object 30 subjected to sintering or melt solidification absorbs electromagnetic waves. The absorbing material may be a compound of these. Preferably, the absorbing material does not contain a volatile component. Since the absorbing material does not contain a volatile component, it is possible to avoid a situation where electromagnetic waves are absorbed into the volatile component.

The promotors 25A and 26A may contain a reducing material which reduces the object 30. The reducing material has a higher melting point than the melting point of the object 30. Examples of the reducing material include carbon and silicon carbide. A carbon material used as the absorbing material may function as the reducing material.

The promotors 25A and 26A may consist of a thermal insulation material alone, may consist of an absorbing material alone, may consist of a reducing material alone, or may contain a combination of these. In addition, each of the thermal insulation material, the absorbing material, and the reducing material may have overlapping properties and functions. For example, the carbon material may function as the absorbing material and may function as the reducing material.

The heating device 20A includes, for example, an aerosol sensor 51A configured to detect an aerosol in the chamber 22A. The aerosol is, for example, smoke or vapor. The smoke may be oil smoke. The vapor may be water vapor. The aerosol is generated, for example, when the object 30 is heated, and a volatile substance contained in the object 30 evaporates. The aerosol sensor 51A measures the aerosol, for example, by irradiating the inside of the chamber 22A with light and measuring an amount of transmitted light. Alternatively, the aerosol sensor 51A measures the aerosol by irradiating the inside of the chamber 22A with light and measuring light scattering. In a case where an aerosol of a predetermined concentration is detected by the aerosol sensor 51A and thereafter, the aerosol has no longer been detected or the aerosol has become less than or equal to a predetermined amount, it can be regarded that evaporation of the volatile substance contained in the object 30 has been completed and sintering and solidification of the object 30 has been completed. The predetermined amount of aerosol may be set based on an amount of volatile substance that the object 30 is allowed to contain. The predetermined amount of aerosol may be a predetermined concentration of aerosol.

The heating device 20A includes, for example, a fire sensor 52A configured to detect a fire, a flame, and a spark in the chamber 22A. The fire, the flame, and the spark break out, for example, when the object 30 is abnormally heated. The heating device 20A includes, for example, temperature sensors 53A, 54A, and 55A configured to detect a temperature in the chamber 22A. The temperature sensors 53A, 54A, and 55A may be radiation thermometers. In a case where the temperature sensors 53A, 54A, and 55A detect that the object 30 has reached a predetermined temperature or detect that the object 30 has reached a predetermined temperature and a predetermined period of time has elapsed, it can be regarded that sintering and solidification of the object 30 have been completed.

The heating device 20A may include an atmosphere control device 56 configured to control an atmosphere in the chamber 22A. The atmosphere control device 56 may set, for example, an inert gas atmosphere in the chamber 22A. Examples of an inert gas include argon (Ar) and helium (He). The atmosphere control device 56 may set, for example, a neutral gas atmosphere in the chamber 22A. Examples of a neutral gas include nitrogen ($N_2$), dry hydrogen ($H_2$), and ammonia ($NH_3$). The atmosphere control device 56 may set, for example, a reducing gas atmosphere in the chamber 22A. Examples of a reducing gas include hydrogen ($H_2$), carbon monoxide (CO), and hydrocarbon gases (such as $CH_4$, $C_3H_8$, and $C_4H_{10}$). By setting the atmosphere in the chamber 22A to be a reducing atmosphere, it is possible to realize reduction of an oxide that may be contained in the object 30.

Figure 10:
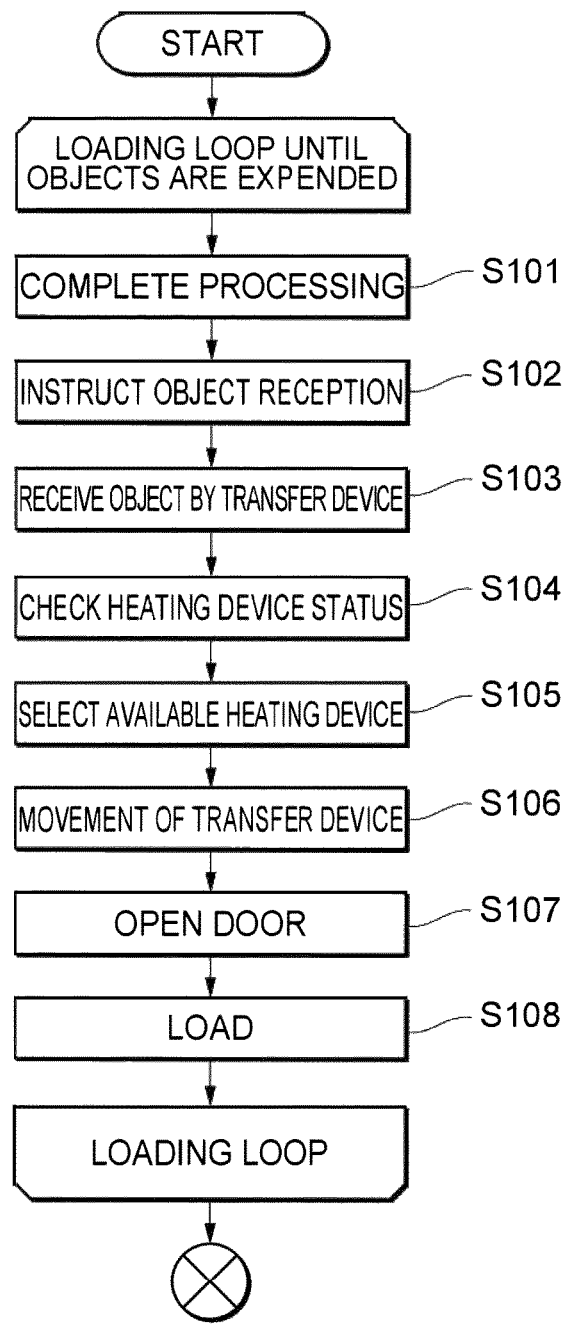
FIG. 10 is a flowchart of a method according to the embodiment.
Figure 11:
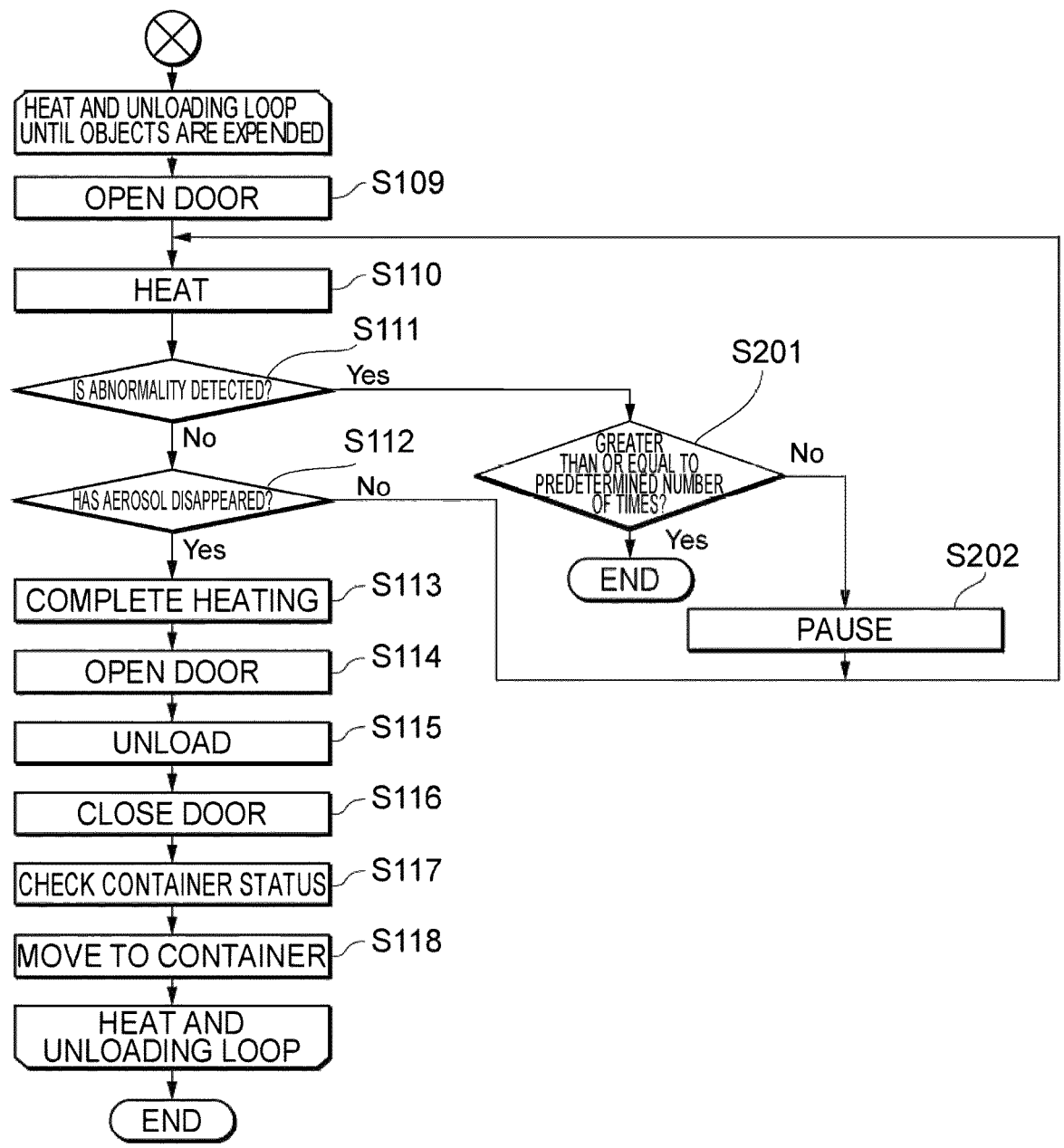
FIG. 11 is a flowchart of the method according to the embodiment.

Next, a method of controlling the transfer device 10 and the plurality of heating devices 20A, 20B, 20C . . . , an operation method of the transfer device 10 and the plurality of heating devices 20A, 20B, 20C . . . , and a method of producing a solid according to the embodiment will be described with reference to flowcharts of FIG. 10 and FIG. 11.

In step S101, the processing device 40 transmits, to the control system 100, a processing completion signal indicating that processing of the object 30 has been completed. The processing completion signal obtainer 110 of the control system 100 receives the processing completion signal. In step S102, the reception instructor 111 of the control system 100 transmits, to the transfer device 10, a reception instruction signal for instructing the transfer device 10 to receive the object 30 from the processing device 40. The transfer device 10 receives the reception instruction signal. It is noted that in a case where the transfer device 10 is not situated in a position of the processing device 40, the movement instructor 103 of the control system 100 instructs the transfer device 10 to move to the position of the processing device 40. The position of the processing device 40 includes a position in the vicinity of the processing device 40 and is, for example, in front of the processing device 40. In step S103, the transfer device 10 receives the object 30 from the processing device 40. The transfer device 10 transmits, to the control system 100, a receipt signal indicating that the object 30 has been received. The receipt signal obtainer 101 of the control system 100 receives the receipt signal.

In step S104, the device selector 102 of the control system 100 transmits, to each of the plurality of heating devices 20A, 20B, 20C . . . , a status check signal for checking whether its status is running or available. Each of the plurality of heating devices 20A, 20B, 20C . . . receives the status check signal. Each of the plurality of heating devices 20A, 20B, 20C . . . transmits, to the device selector 102 of the control system 100, a status notification signal for notifying that its status is running or available. The device selector 102 of the control system 100 receives the status notification signal.

In step S105, the device selector 102 of the control system 100 selects, from among the plurality of heating devices 20A, 20B, 20C . . . , an available heating device as a selected heating device. In a case where there are a plurality of available heating devices, the device selector 102 of the control system 100 may select an available heating device to which a movement distance of the transfer device 10 becomes the shortest as the selected heating device. Herein, an example will be described where the device selector 102 of the control system 100 selects the heating device 20A as the selected heating device.

In step S106, the movement instructor 103 of the control system 100 transmits, to the transfer device 10, a movement instruction signal for instructing the transfer device 10 to move to a position of the selected heating device. The transfer device 10 receives the movement instruction signal. The transfer device 10 moves to the position of the heating device 20A serving as the selected heating device. The position of the heating device 20A includes a position in the vicinity of the heating device 20A and is, for example, in front of the heating device 20A. The transfer device 10 transmits, to the control system 100, a standby signal indicating that transfer device 10 stands by in the position of the selected heating device. The standby signal obtainer 104 of the control system 100 receives the standby signal. In step S107, the loading instructor 105 of the control system 100 transmits, to the selected heating device, a door open instruction signal for instructing the selected heating device to open the door 21A. The selected heating device receives the door open instruction signal and opens the door 21A.

In step S108, the loading instructor 105 of the control system 100 transmits, to the transfer device 10, a loading instruction signal for instructing the transfer device 10 to load the object 30 into the selected heating device the door 21A of which has been opened. The transfer device 10 receives the loading instruction signal and loads the object 30 into the selected heating device. The transfer device 10 transmits, to the control system 100, a loading signal indicating that the object 30 has been loaded into the selected heating device. The loading signal obtainer 106 of the control system 100 receives the loading signal.

While the processing device 40 processes a plurality of objects 30, a loop from steps S101 to S108 may be repeated, and the plurality of objects 30 may be sequentially loaded into available heating devices. The loop from steps S101 to S108 may be implemented in parallel with step S109 to step S113 which will be described below. Therefore, after step S108 is implemented, the flow may proceed to step S109 in parallel with the repetition of the loop from steps S101 to S108.

In step S109, the heating instructor 107 of the control system 100 transmits, to the selected heating device, a heating instruction signal for instructing the selected heating device to close the door 21A and heat the object 30. The selected heating device receives the heating instruction signal. The heating instructor 107 may transmit a heating condition based on a composition of the object 30 to the selected heating device. The heating condition is set, for example, based on the material of the object 30. The heating condition is set, for example, based on a melting point and a sintering temperature of the material of the object 30. The heating condition is set, for example, based on an amount of impurity contained in the object 30. The heating condition may include an atmosphere condition in the chamber of the selected heating device. The selected heating device closes the door 21A. In step S110, the selected heating device heats the object 30 therein. In a case where the heating condition has been received, the selected heating device heats the object 30 according to the heating condition. In a case where the heating condition includes an atmosphere condition, the atmosphere control device 56 of the selected heating device controls an atmosphere in the chamber of the selected heating device according to the atmosphere condition.

In step S111, in a case where the fire sensor 52A of the selected heating device has not detected a fire, a flame, or a spark caused by abnormal heating of the object 30, the flow proceeds to step S112. In step S111, in a case where the fire sensor 52A of the selected heating device has detected a fire, a flame, or a spark caused by abnormal heating of the object 30, in step S201, it is determined whether or not the number of times to have detected the fire, the flame, or the spark is greater than or equal to a predetermined number of times. In a case where the number of times to have detected the fire, the flame, or the spark is greater than or equal to the predetermined number of times, the selected heating device stops the heating of the object 30. In a case where the number of times to have detected the fire, the flame, or the spark is not greater than or equal to the predetermined number of times, in step S202, the selected heating device pauses the heating of the object 30. Thereafter, the flow returns to step S110.

In step S112, in a case where an impurity adheres to the object 30 or the object 30 contains an impurity, the impurity evaporates from the object 30 due to heating to generate an aerosol. In a case where the aerosol sensor 51A of the selected heating device detects an aerosol, and thereafter, the aerosol has no longer been detected or the aerosol has become less than or equal to a predetermined amount, the flow proceeds to step S113. In a case where the aerosol sensor 51A of the selected heating device has not detected an aerosol even once or keeps detecting the aerosol, the flow returns to step S110, and the selected heating device continues the heating of the object 30. In step S113, the selected heating device stops the heating and solidification of the object 30. The selected heating device transmits, to the control system 100, a heating completion signal indicating that the heating of the object 30 has been completed. The heating completion signal obtainer 108 of the control system 100 receives the heating completion signal.

In step S114, the unloading instructor 109 of the control system 100 transmits the door open instruction signal to the selected heating device to instruct the selected heating device to open the door 21A. The selected heating device receives the door open instruction signal and opens the door 21A. In step S115, the unloading instructor 109 of the control system 100 transmits, to the transfer device 10, an unloading instruction signal to instruct the transfer device 10 to unload the object 30 from the selected heating device. The transfer device 10 receives the unloading instruction signal and unloads the object 30 from the selected heating device the door 21A of which has been opened. It is noted that in a case where the transfer device 10 is not situated in the position of the selected heating device, the movement instructor 103 of the control system 100 instructs the transfer device 10 to move to the position of the selected heating device. In addition, in a case where the transfer device 10 implements the loop from steps S101 to S108, after the loop from steps S101 to S108 has been implemented once, the transfer device 10 may pause the loop from steps S101 to S108 to implement step S115.

In step S116, the unloading instructor 109 of the control system 100 transmits, to the selected heating device, a door close instruction signal for instructing the selected heating device to close the door 21A. The selected heating device receives the door close instruction signal and closes the door 21A. In step S117, the container status checker 112 of the control system 100 transmits, to the container 60, a container status check signal for checking whether there is a space for accommodating the object 30. The container 60 receives the container status check signal. In a case where there is a space for accommodating the object 30, the container 60 transmits, to the control system 100, a container status notification signal indicating that there is a space for accommodating the object 30. The container status checker 112 of the control system 100 receives the container status notification signal.

In step S118, the movement instructor 103 of the control system 100 instructs the transfer device 10 to move the object 30 unloaded from the selected heating device into the container 60. The transfer device 10 moves to a position of the container 60. The position of the container 60 includes a position in the vicinity of the container 60 and is, for example, in front of the container 60. The transfer device 10 puts the object 30 into the container 60.

Figure 12:
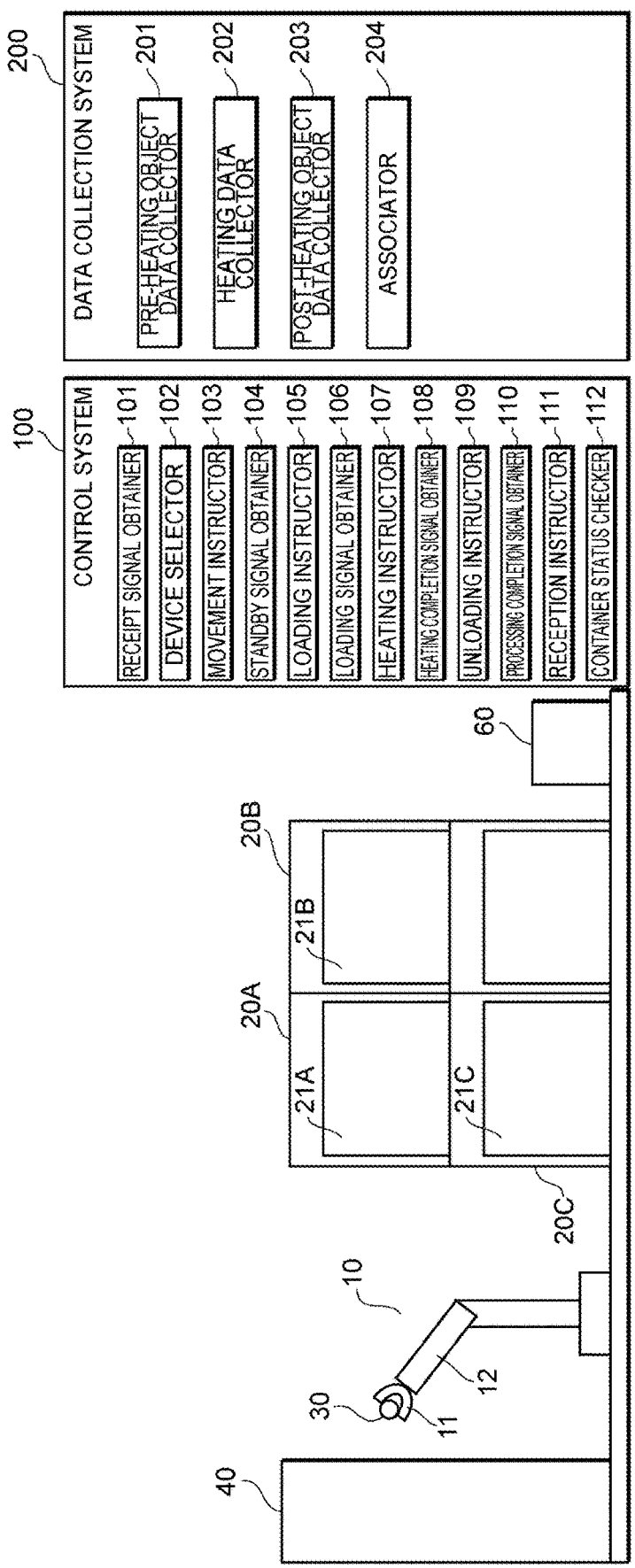
FIG. 12 is a schematic diagram of a data collection system according to the embodiment.

A data collection system 200 according to the embodiment illustrated in FIG. 12 includes a pre-heating object data collector 201 configured to collect data of the object 30 before being heated by the heating devices 20A, 20B, 20C . . . . The data of the object 30 before being heated is, for example, a weight, a shape, a temperature, a strength, an ingredient of a raw material, a particle size of the raw material, an ingredient mixed in the raw material, a source of the raw material, and a date of receipt of the raw material of the object 30 before being heated.

The weight of the object 30 before being heated is measured, for example, by a mass meter provided in the processing device 40, the transfer device 10, or the heating devices 20A, 20B, 20C . . . or provided in the vicinity of these devices and is transmitted to the pre-heating object data collector 201. Examples of the mass meter include a load cell.

The shape of the object 30 before being heated is measured by a shape measurement machine provided in the processing device 40, the transfer device 10, or the heating devices 20A, 20B, 20C . . . or provided in the vicinity of these devices and is transmitted to the pre-heating object data collector 201. Examples of the shape include a height, a width, and a surface roughness. Examples of the shape measurement machine include a laser sensor and a camera.

The temperature of the object 30 before being heated is measured by a thermometer provided in the processing device 40, the transfer device 10, or the heating devices 20A, 20B, 20C . . . or provided in the vicinity of these devices and is transmitted to the pre-heating object data collector 201. Examples of the thermometer include a radiation thermometer and a thermocouple.

The strength of the object 30 before being heated is measured by a strength measurement machine provided in the processing device 40, the transfer device 10, or the heating devices 20A, 20B, 20C . . . or provided in the vicinity of these devices and is transmitted to the pre-heating object data collector 201. Examples of the strength measurement machine include a torque sensor. For example, in a mechanism in which the object 30 is gripped, in a case where a ball screw is driven by a motor to clamp the object 30 between parts for gripping the object 30, a rotational torque of the motor may be detected.

The data collection system 200 according to the embodiment includes a heating data collector 202 configured to collect heating data in the heating devices 20A, 20B, 20C . . . . The heating data is, for example, an arrangement of the object 30 in the heating devices 20A, 20B, 20C . . . , a change over time of a temperature of the object 30, a change over time of a temperature of the door, a heating time period, a strength of electromagnetic waves, a change over time of an atmospheric gas component, a change over time of an atmospheric gas concentration, a change over time of an exhaust gas component, a change over time of an exhaust gas concentration, a change over time of a temperature of an exhaust gas, a change over time of an aerosol concentration, the presence or absence of fire, and a firing time period.

The arrangement of the object 30 in the heating devices 20A, 20B, 20C . . . is measured, for example, by a position sensor provided in the heating devices 20A, 20B, 20C . . . and is transmitted to the heating data collector 202. Examples of the position sensor include a laser sensor.

The change over time of the temperature of the object 30 in the heating devices 20A, 20B, 20C . . . , the change over time of the temperature of the door, and the change over time of the temperature of the exhaust gas are measured, for example, by a thermometer provided in the heating devices 20A, 20B, 20C . . . and are transmitted to the heating data collector 202. Examples of the thermometer include a radiation thermometer and a thermocouple.

The heating time period in the heating devices 20A, 20B, 20C . . . is measured, for example, by an electromagnetic wave irradiation device provided in the heating devices 20A, 20B, 20C . . . and is transmitted to the heating data collector 202. The strength of electromagnetic waves in the heating devices 20A, 20B, 20C . . . is measured, for example, by an electromagnetic wave detector provided in the heating devices 20A, 20B, 20C . . . and is transmitted to the heating data collector 202.

The change over time of the atmospheric gas component, the change over time of the atmospheric gas concentration, the change over time of the exhaust gas component, and the change over time of the exhaust gas concentration in the heating devices 20A, 20B, 20C . . . are measured, for example, by a gas sensor provided in the heating devices 20A, 20B, 20C . . . and are transmitted to the heating data collector 202.

The change over time of the aerosol concentration in the heating devices 20A, 20B, 20C . . . is measured, for example, by an aerosol sensor provided in the heating devices 20A, 20B, 20C . . . and is transmitted to the heating data collector 202.

The presence or absence of fire and the firing time period in the heating devices 20A, 20B, 20C . . . are measured, for example, by a fire sensor provided in the heating devices 20A, 20B, 20C . . . and are transmitted to the heating data collector 202.

The data collection system 200 according to the embodiment includes a post-heating object data collector 203 configured to collect data of the object 30 after being heated by the heating devices 20A, 20B, 20C . . . . The data of the object 30 after being heated is, for example, a weight, a shape, a temperature, a strength, and a processing lot number of the object 30 after being heated. A processing lot is, for example, a set of a plurality of objects 30 heated during a certain period of time. Alternatively, the processing lot may be a set of a certain number of objects 30.

The weight of the object 30 after being heated is measured, for example, by a mass meter provided in the transfer device 10, the heating devices 20A, 20B, 20C . . . , or the container 60 or provided in the vicinity of these devices and is transmitted to the post-heating object data collector 203. Examples of the mass meter include a load cell.

The shape of the object 30 after being heated is measured by a shape measurement machine provided in the transfer device 10, the heating devices 20A, 20B, 20C . . . , or the container 60 or provided in the vicinity of these devices and is transmitted to the post-heating object data collector 203. Examples of the shape include a height, a width, and a surface roughness. Examples of the shape measurement machine include a laser sensor and a camera.

The temperature of the object 30 after being heated is measured by a thermometer provided in the transfer device 10, the heating devices 20A, 20B, 20C . . . , or the container 60 or provided in the vicinity of these devices and is transmitted to the post-heating object data collector 203. Examples of the thermometer include a radiation thermometer and a thermocouple.

The strength of the object 30 after being heated is measured by a strength measurement machine provided in the transfer device 10, the heating devices 20A, 20B, 20C . . . , or the container 60 or provided in the vicinity of these devices and is transmitted to the post-heating object data collector 203. Examples of the strength measurement machine include a torque sensor.

The data collection system 200 according to the embodiment includes an associator 204 configured to associate an identifier of the object 30 heated by the heating devices 20A, 20B, 20C . . . with data collected by at least any of the pre-heating object data collector 201, the heating data collector 202, and the post-heating object data collector 203. By associating the identifier of the object 30 with these pieces of data, a quality of the object 30 can be guaranteed, or in a case where a defect occurs in the object 30, it is possible to use the data to find out a cause of the defect.

As above, the present invention has been described by way of the embodiment, but the description and drawings forming part of this disclosure is not to be understood as limiting the present invention. For example, in step S112 in the method of controlling the transfer device 10 and the plurality of heating devices 20A, 20B, 20C . . . according to the embodiment, the operation method of the transfer device 10 and the plurality of heating devices 20A, 20B, 20C . . . , and the method of producing the solid which have been described with reference to the flowcharts in FIG. 10 and FIG. 11, instead of detection of the aerosol, or in addition to detection of the aerosol, in a case where the temperature sensors 53A, 54A, and 55A detect the temperature of the object 30 and the object 30 has reached a predetermined temperature or a case where it is detected that the object 30 has reached a predetermined temperature and a predetermined period of time has elapsed, the flow may proceed to step S113, and in a case where the object 30 has not reached the predetermined temperature, the flow may return to step S110. From this disclosure, various alternative embodiments, embodiments, and operational techniques are to become apparent to those skilled in the art. It is to be understood that the present invention encompasses various embodiments and the like that are not described herein.

REFERENCE LIST

10 . . . transfer device,
11 . . . grip device,
12 . . . movement device,
20A, 20B, 20C . . . heating device,
21A, 21B, 21C . . . door,
22A . . . chamber,
23A . . . stage,
24A . . . drive device,
25A, 26A . . . promotor,
27A . . . shaft,
30 . . . object,
40 . . . processing device,
50A . . . electromagnetic wave irradiation device,
51A . . . aerosol sensor,
52A . . . fire sensor,
53A, 54A, 55A . . . temperature sensor,
60 . . . container,
61A . . . window,
100 . . . control system,
101 . . . receipt signal obtainer,
102 . . . device selector,
103 . . . movement instructor,
104 . . . standby signal obtainer,
105 . . . loading instructor,
106 . . . loading signal obtainer,
107 . . . heating instructor,
108 . . . heating completion signal obtainer,
109 . . . unloading instructor,
110 . . . processing completion signal obtainer,
111 . . . reception instructor,
112 . . . container status checker,
200 . . . data collection system,
201 . . . pre-heating object data collector,
202 . . . heating data collector,
203 . . . post-heating object data collector,
204 . . . associator

The invention claimed is:

1. A control system configured to control a transfer device and a plurality of heating devices, the control system comprising:
   a receipt signal obtainer configured to obtain a receipt signal indicating that the transfer device has received an object;
   a device selector configured to select an available heating device as a selected heating device from among the plurality of heating devices in a case where the receipt signal obtainer has received the receipt signal;
   a movement instructor configured to instruct the transfer device to move to a position of the selected heating device;
   a standby signal obtainer configured to obtain a standby signal indicating that the transfer device stands by in the position of the selected heating device;
   a loading instructor configured to instruct, in a case where the standby signal obtainer has obtained the standby signal, the selected heating device to open a door and instruct the transfer device to load the object into the selected heating device;
   a loading signal obtainer configured to obtain a loading signal indicating that the transfer device has loaded the object into the selected heating device;
   a heating instructor configured to instruct, in a case where the loading signal obtainer has obtained the loading signal, the selected heating device to close the door and heat the object;
   a heating completion signal obtainer configured to obtain a heating completion signal indicating that heating of the object has been completed in the selected heating device; and
   an unloading instructor configured to instruct, in a case where the heating completion signal obtainer has obtained the heating completion signal, the selected heating device to open the door and instruct the transfer device to unload the object from the selected heating device,
      wherein each of the plurality of heating devices includes an aerosol sensor, and in a case where the aerosol sensor detects an aerosol and thereafter, the aerosol has no longer been detected or the aerosol has become less than or equal to a predetermined amount, the heating completion signal is issued,
   wherein the aerosol is smoke or vapor,
   wherein the object contains oil or water,
   wherein the object further contains a metal or a metal compound, and
      wherein each of the plurality of heating devices includes an irradiation device configured to emit electromagnetic waves therein.

2. The control system according to claim 1, wherein the transfer device receives the object from a processing device.

3. The control system according to claim 2, wherein the processing device is a molding machine.

4. The control system according to claim 3, wherein the molding machine is a briquette machine.

5. The control system according to claim 2, further comprising:
   a processing completion signal obtainer configured to obtain a processing completion signal indicating that processing of the object in the processing device has been completed; and
   a reception instructor configured to instruct, in a case where the processing completion signal obtainer has obtained the processing completion signal, the transfer device to receive the object from the processing device.

6. The control system according to claim 5, wherein in a case where the processing completion signal obtainer has obtained the processing completion signal, the movement instructor instructs the transfer device to move to a position of the processing device.

7. The control system according to claim 2, wherein in a case where the loading signal obtainer has obtained the loading signal, the movement instructor instructs the transfer device to move to a position of the processing device.

8. The control system according to claim 1, wherein in a case where the heating completion signal obtainer has obtained the heating completion signal, the movement instructor instructs the transfer device to move to the position of the selected heating device.

9. The control system according to claim 1, further comprising:
   a container status checker configured to obtain a container status signal indicating that a container has a space to accommodate the object, wherein
   in a case where the container status checker has obtained the container status signal, the movement instructor instructs the transfer device to move the object unloaded from the selected heating device into the container.

10. The control system according to claim 1, wherein the heating instructor transmits a heating condition based on a composition of the object to the selected heating device.

* * * * *